(12) United States Patent
Maile et al.

(10) Patent No.: US 12,239,108 B2
(45) Date of Patent: Mar. 4, 2025

(54) FEEDING SYSTEMS AND APPARATUS FOR AQUARIUMS

(71) Applicant: ALGAEBARN, LLC, Commerce City, CO (US)

(72) Inventors: Alex J. Maile, Avon, MN (US); Sean L. Tadjeran, Commerce City, CO (US)

(73) Assignee: AlgaeBarn, LLC, Commerce City, CO (US)

( * ) Notice: Subject to any disclaimer, the term of this patent is extended or adjusted under 35 U.S.C. 154(b) by 563 days.

(21) Appl. No.: 17/158,640

(22) Filed: Jan. 26, 2021

(65) Prior Publication Data

US 2021/0227805 A1 Jul. 29, 2021

Related U.S. Application Data

(63) Continuation of application No. PCT/US2021/014906, filed on Jan. 25, 2021, which
(Continued)

(51) Int. Cl.
*A01K 63/00* (2017.01)

(52) U.S. Cl.
CPC .................................. *A01K 63/006* (2013.01)

(58) Field of Classification Search
USPC ....... 119/245, 200, 210, 212, 230, 246, 247, 119/269
See application file for complete search history.

(56) References Cited

U.S. PATENT DOCUMENTS

| | | | | |
|---|---|---|---|---|
| 2,711,714 A | * | 6/1955 | Timeus | A01K 61/85 119/6.7 |
| 2,754,800 A | * | 7/1956 | Gare | A01K 61/85 119/51.04 |

(Continued)

FOREIGN PATENT DOCUMENTS

| | | | | |
|---|---|---|---|---|
| CN | 203646158 | * | 6/2014 | A01G 9/02 |
| CN | 206109059 | * | 4/2017 | C02F 3/32 |

(Continued)

OTHER PUBLICATIONS

Floating Fish Food and Algae Clip, downloaded from the internet on May 1, 2020, at https://www.saltwateraquarium.com/floating-fish-food-algae-clip-zoo-med/?gclid=EAIaIOobChMIkZXMsIyT6QIVDdbACh0ZmgGEEAQYASABEgK3MPD_BwE, by Saltwater Aquarium.com, 1685 Fairfield Road, Suite C, Gettysburg, PA 17325, 2018.
(Continued)

*Primary Examiner* — Andrea M Valenti
(74) *Attorney, Agent, or Firm* — Greenberg Traurig, LLP

(57) ABSTRACT

Aquarium feeding systems are disclosed. In one aspect, a system (10) includes a flotation base (20) adapted to float on water, and a feeding apparatus adapted to be repeatedly inserted into and removed from the flotation base (20). In one approach, the feeding apparatus comprises a flotation insert (30) and a food tray (40). The food tray (40) comprises a plurality of apertures (46) sized to allow passage of aquatic food into an aquarium. In another approach, the feeding apparatus comprises a clip (130) suited to hold seaweed or other food materials. In another approach, the feeding apparatus comprises a basket (230) for holding food materials, the basket (230) having one or more apertures (246) sized to allow passage of aquatic food into an aquarium.

12 Claims, 16 Drawing Sheets

Related U.S. Application Data is a continuation-in-part of application No. 29/744,129, filed on Jul. 27, 2020, now Pat. No. Des. 945,080, and a continuation-in-part of application No. 16/773,381, filed on Jan. 27, 2020.

(56) References Cited

U.S. PATENT DOCUMENTS

| | | | | |
|---|---|---|---|---|
| 2,761,422 | A * | 9/1956 | Martin | A01K 61/85 119/51.04 |
| 2,984,208 | A * | 5/1961 | Kopietz | A01K 61/80 43/44.99 |
| 3,095,852 | A | 7/1963 | Goldman | |
| 3,260,238 | A * | 7/1966 | Holden | A01K 61/85 43/44.99 |
| 3,465,719 | A * | 9/1969 | Holden | A01K 61/85 119/51.04 |
| 3,512,505 | A | 5/1970 | Cross et al. | |
| 3,664,303 | A | 5/1972 | Baensch | |
| 3,742,912 | A * | 7/1973 | Chen | A01K 61/80 119/51.03 |
| 3,939,802 | A | 2/1976 | Neff | |
| 3,993,028 | A | 11/1976 | Baensch et al. | |
| 4,638,585 | A * | 1/1987 | Korte | A01K 91/02 43/26.1 |
| 4,903,429 | A * | 2/1990 | Tetenes | A01K 97/02 43/44.99 |
| 4,914,856 | A * | 4/1990 | Kennedy | A01K 69/00 43/100 |
| D323,698 | S * | 2/1992 | Nelson | D22/136 |
| 5,117,577 | A * | 6/1992 | Burghoff | A01K 97/02 43/44.99 |
| 5,778,824 | A | 7/1998 | Musgrave et al. | |
| 6,070,554 | A | 6/2000 | Wilson | |
| 6,109,210 | A | 8/2000 | Nasser | |
| 7,249,435 | B1 * | 7/2007 | Tetenes | A01K 97/20 43/44.99 |
| 7,699,277 | B2 | 4/2010 | Bagnall | |
| 8,001,717 | B1 * | 8/2011 | Bright, II | A01K 97/05 43/55 |
| 9,089,116 | B2 | 7/2015 | Tuan et al. | |
| 10,405,525 | B2 | 9/2019 | Yim | |
| 2005/0055869 | A1 * | 3/2005 | Corso | A01K 97/06 43/54.1 |
| 2007/0266954 | A1 | 11/2007 | Chapman | |
| 2009/0250011 | A1 | 10/2009 | Biggs | |
| 2013/0174786 | A1 | 7/2013 | Bagnall | |
| 2014/0261211 | A1 * | 9/2014 | Tuan | A01K 61/85 119/51.01 |
| 2018/0184690 | A1 | 7/2018 | Andrew | |

FOREIGN PATENT DOCUMENTS

| | | | |
|---|---|---|---|
| DE | 10-2004-032855 | 2/2006 | |
| GB | 2335835 | * 10/1999 | A01K 61/02 |

OTHER PUBLICATIONS

Fishuel Aquarium Feeding Ring Floating Rings Food Feeder, downloaded from the internet on May 1, 2020, at https://www.amazon.com/Fischuel-Aquarium-Feeding-Floating-Suction/dp/B07X9B8WJ4.

International Search Report and Written Opinion, dated Jun. 3, 2021, from related International Patent App. No. PCT/US2021/014906.

"POPETPOP Aquarium Feeder Cone-2pcs Bloodworm Feeder Cone Floating Fish Feeder, Fish Tank Feeding Cup Plastic Cone Basket", retrieved from the internet Mar. 29, 2021 at URL+https://www.amaxon.com/POPETPOP-Aquarium-Cone-2pcs-Bloodworm-Floating/dp/B07SWHP43J.

* cited by examiner

FEEDING SYSTEMS AND APPARATUS FOR AQUARIUMS

CROSS-REFERENCE TO RELATED APPLICATIONS

The present application is a continuation of and claims priority to International Patent Application No. PCT/US2021/014906, filed Jan. 25, 2021. The present application also claims priority to U.S. Non-Provisional patent application Ser. No. 16/773,381, filed Jan. 27, 2020, entitled "Floating Seaweed/Nori Clip," and to U.S. Design patent application No. 29/744,129, filed Jul. 27, 2020, entitled "Fish Feeding Apparatus." Each of the above-identified patent applications are herein by reference in its entirety.

BACKGROUND

Apparatus for feeding aquatic life in aquariums are known. For instance, U.S. Pat. Nos. 2,711,714 and 2,761,422 describe apparatus for feeding aquatic life in aquariums. However, such apparatus offer poor aquatic viewing experiences and do not facilitate ready supply of aquatic food within a predefined space.

SUMMARY OF THE INVENTION

Briefly, the present disclosure relates to modular aquarium feeding systems. The systems generally include a flotation base. The systems also include a feeding apparatus adapted to be repeatedly inserted into and removed from the flotation base. In one embodiment, the feeding apparatus comprises a flotation insert and a corresponding food tray. In another embodiment, the feeding apparatus comprises a clip. In yet another embodiment, the feeding apparatus comprises a basket. At least a portion of the feeding apparatus may be located above a water level of the aquarium to facilitate ready removal thereof while keeping a user's hands dry, i.e., the water of the aquarium may not contact the user's hands during placement of the food. The systems may float freely about the aquarium while also containing the food facilitating ready recognition of where aquatic feeding will occur, thereby enhancing/improving the aquarium viewing experience and/or more uniform distribution of food to aquatic life.

BRIEF DESCRIPTION OF THE DRAWINGS

FIG. 9 is a first side view of the assembled system (110) of FIG. 8a.

FIG. 10 is a second side view of the assembled system (110) of FIG. 8a.

FIG. 11 is a perspective view of the assembled system (110) of FIG. 8a.

DETAILED DESCRIPTION

Figure 1:
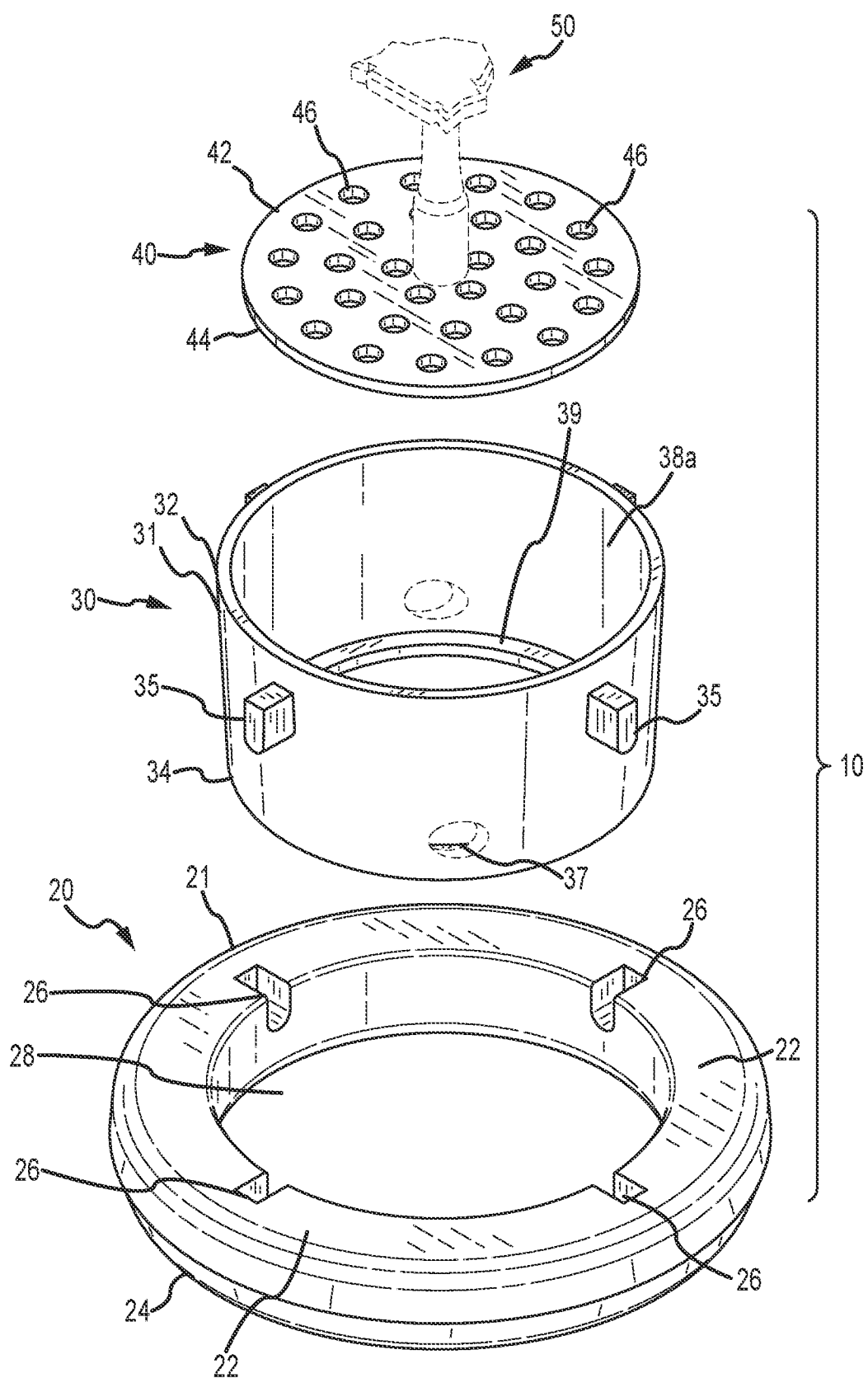
FIG. 1 is an exploded, perspective view of one embodiment of an aquarium feeding system (10) of the present disclosure.
Figure 2:
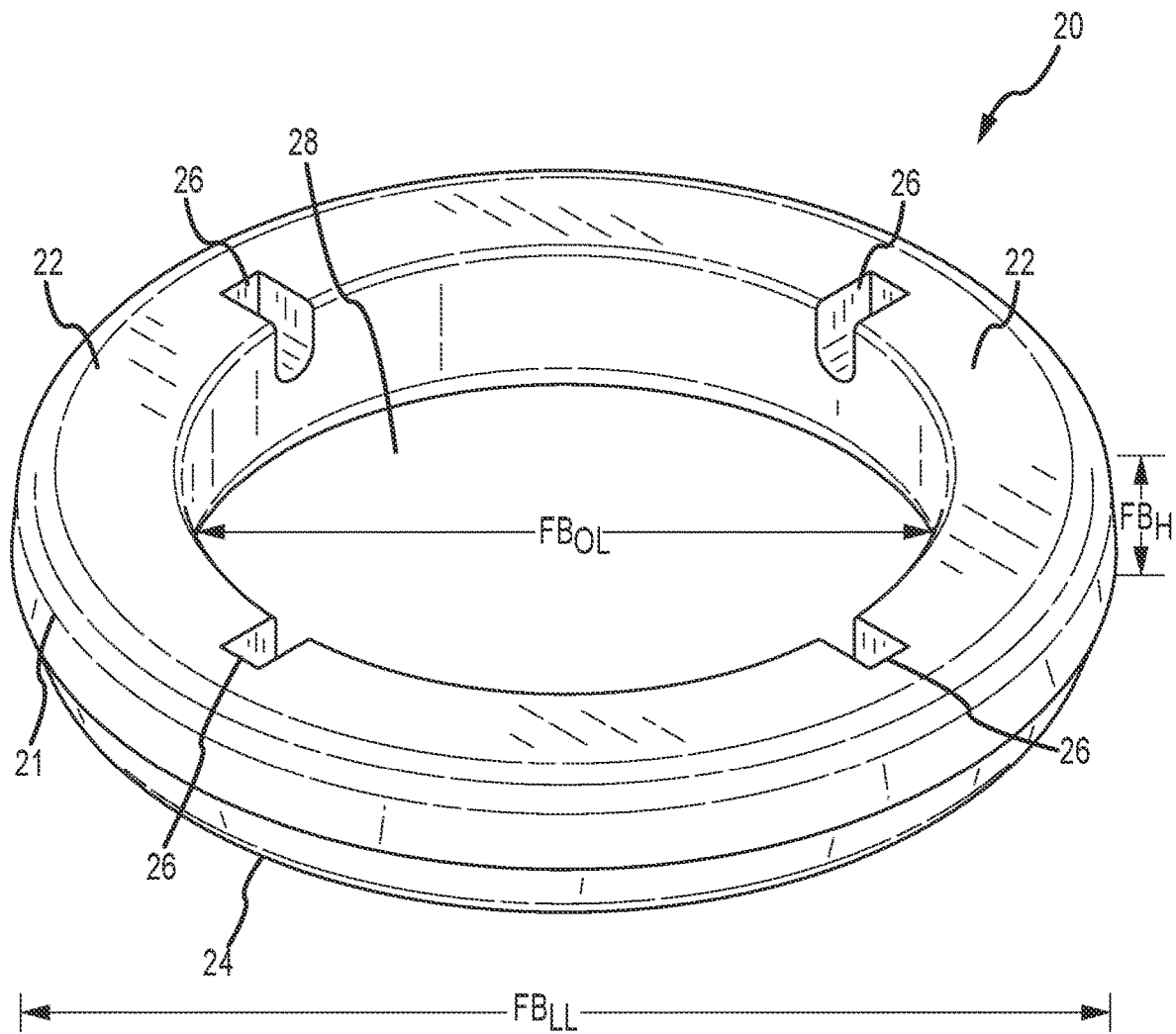
FIG. 2 is a perspective view of a floatation base (20) of the embodiment of FIG. 1.

Reference is now made to various figures of the application, which illustrate various non-limiting embodiments of the novel and inventive aquarium feeding systems and apparatus described herein.

Referring now to FIGS. 1-7, one embodiment of an aquarium feeding system (10) is illustrated. In the illustrated embodiment, the system (10) includes (a) a flotation base (20) adapted to float on water, (b) a flotation insert (30), and (c), a food tray (40). As described in further detail below, the flotation base (20) generally provides buoyancy for the system. The flotation insert (30) is adapted to be removably inserted into and removed from the flotation base (20) (e.g., to allow for modularity, which facilitates use of other inserts, such as a clip insert, described in further detail below relative to FIGS. 8a-12, or a basket insert, described in further detail below relative to FIG. 13). The food tray (40) is adapted to be removably inserted into and removed from the flotation insert (30), such as via optional handle (50).

Figure 14:
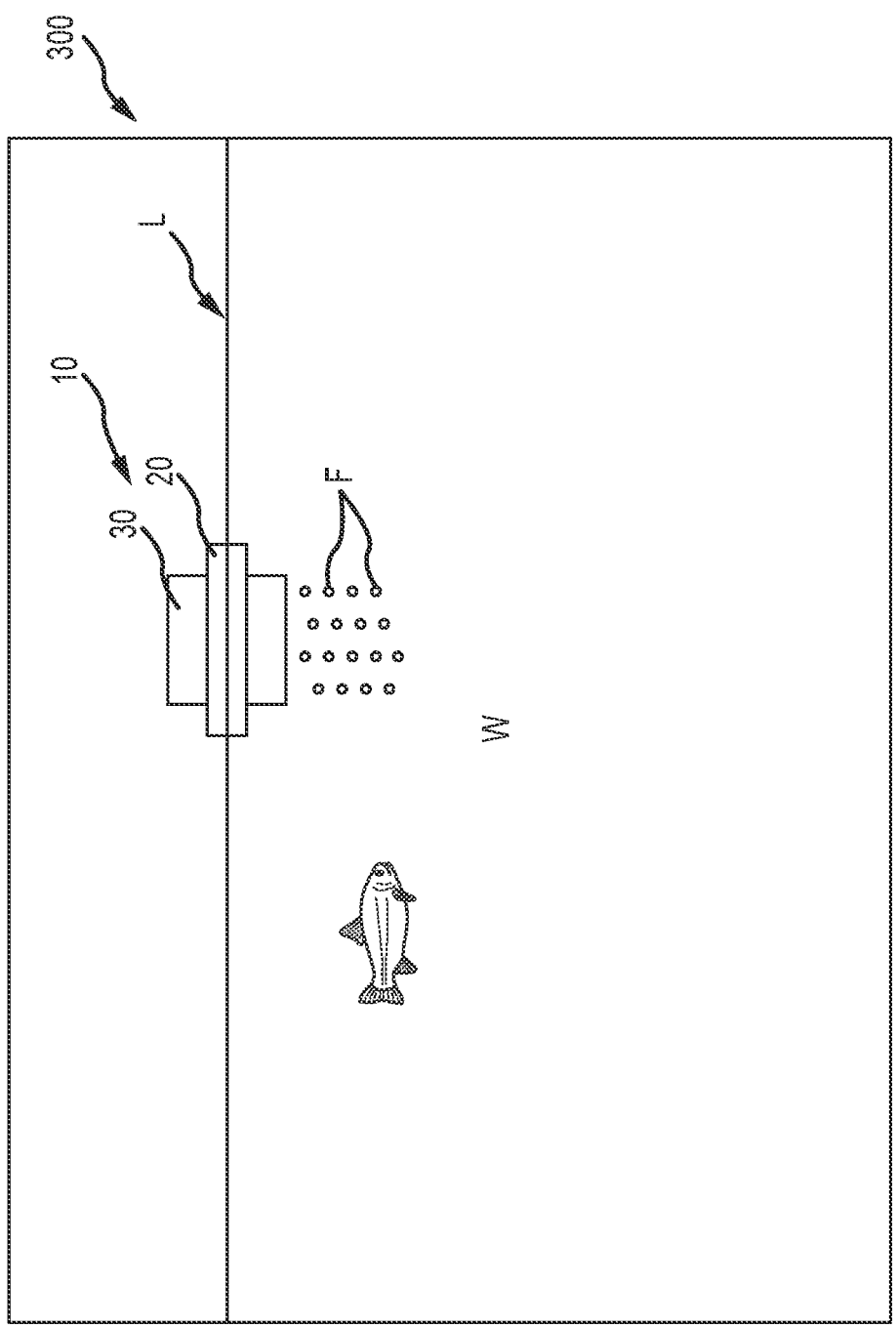
FIG. 14 is a side view of an embodiment of the system (10) of FIGS. 1-7 in an aquarium (300).

In operation, the flotation base (20) and flotation insert (30) are placed in an aquarium (300) filled with water (W) (see FIG. 14). Aquatic food (e.g., fish food) is placed on food tray (40), which is then lowered into the flotation insert (30). The flotation insert (30) has a height ($FI_H$) that extends above the water level (L) of the aquarium (300). Thus, while the aquatic food hydrates, it is retained within the system (10) by the walls of the floatation insert (30), even if the food floats to the water level (L) of the aquarium. As the food hydrates, which may take several minutes, the food loses its buoyancy and descends below the water level (L), and, ultimately to the food tray (40). Appropriately sized apertures (46) of the food tray (40) allow the hydrated food (F) to exit the system (10) and into the water (W) below, thereby feeding aquatic life of aquarium. Thus, the exact location where the hydrated aquatic food will reach the aquatic life is known (i.e., where the system (10) is located), enhancing the aquarium viewing experience of the users. Moreover, the system (10) generally floats freely around the aquarium (300) via flotation base (10), so the aquatic food may be randomly distributed with each feeding, also enhancing the viewing experience of the users.

The system (10) may also facilitate more uniform food distribution to the aquatic life population of the aquarium (300). For instance, because more aggressive fish cannot capsize/sink the system (e.g., by hitting it with force/ramming it) and/or because more aggressive fish are restricted from accessing the aquatic food until it properly hydrates, food may be more uniformly distributed to aquatic life. The system (10) may also facilitate more uniform food distribution because the system (10) freely floats around the aquarium and may, therefore, feed less aggressive members of the aquatic population, e.g., after the aggressive population has lost interest and/or have already eaten. Moreover, some aquatic life members tend not to participate in surface feeding; by containing the food within the system (10) in combination with free movement of the system (10) about the aquarium (300), non-surface feeding aquatic life may be more readily fed/nourished/maintained in good health.

The system (10) may also facilitate improved operation and/or lifetime of components of the aquarium (300). For instance, dry food particles will be restricted/prevented from exiting the system (10). Accordingly, such dry food particles will be restricted/prevented from entering other components of the aquarium (e.g., filters, pumps) and damaging/clogging them.

In one embodiment, the aquarium (300) is a marine aquarium. Marine aquariums may realize stronger currents than a freshwater aquarium. Nonetheless, despite the stronger currents, the system (10) is capable of maintaining the food within a confined space, facilitating appropriate feeding of the aquatic marine life of the aquarium.

i. The Flotation Base

As shown in FIGS. 1-2 and 5-7, the flotation base (20) comprises an outer perimeter (21) and an inner opening (28). The outer perimeter (21) of the flotation base (20) comprises an upper surface (22) and a lower surface (24). One or more slots (26) are provided in the upper surface (22) for receiving corresponding extensions (35) of the flotation insert (30). In other embodiments (not illustrated), the flotation base may comprise one or more extensions for mating with one or more corresponding slots of the flotation insert. The opening (28) of the flotation base (20) is sized to receive the flotation insert (30) such that the flotation insert (30) sits within an interior of the flotation base (20). In the illustrated embodiment, the flotation base (20) is in the form of a tube having a hollow interior surrounded by a solid exterior (e.g., an annular ring shape). However, the flotation base may be in the form of a donut being completely solid throughout the outer perimeter (21). Moreover, any suitable geometric shape may be used.

The flotation base (20) is generally sized to ensure the system (10) does not flip during operation. In one approach, the opening (28) of the flotation base (20) comprises a flotation base opening length ($FB_{OL}$) and a flotation base height ($FB_H$) (see FIG. 2). In one embodiment, a ratio of the flotation base opening length ($FB_{OL}$) to the flotation base height ($FB_H$) is at least 2:1 ($FB_{OL}:FB_H$). In another embodiment, a ratio of the flotation base opening length ($FB_{OL}$) to the flotation base height ($FB_H$) is at least 3:1 ($FB_{OL}:FB_H$). In another embodiment, a ratio of the flotation base opening length ($FB_{OL}$) to the flotation base height ($FB_H$) is at least 4:1 ($FB_{OL}:FB_H$).

In one approach, the flotation base (20) comprises a flotation base longitudinal length ($FB_{LL}$). In one embodiment, a ratio of the flotation base longitudinal length ($FB_{LL}$) to the flotation base height ($FB_H$) is at least 2:1 ($FB_{LL}:FB_H$). In another embodiment, a ratio of the flotation base longitudinal length ($FB_{LL}$) to the flotation base height ($FB_H$) is at least 3:1 ($FB_{LL}:FB_H$). In yet another embodiment, a ratio of the flotation base longitudinal length ($FB_{LL}$) to the flotation base height ($FB_H$) is at least 4:1 ($FB_{LL}:FB_H$). In another embodiment, a ratio of the flotation base longitudinal length ($FB_{LL}$) to the flotation base height ($FB_H$) is at least 5:1 ($FB_{LL}:FB_H$). In yet another embodiment, a ratio of the flotation base longitudinal length ($FB_{LL}$) to the flotation base height ($FB_H$) is at least 6:1 ($FB_{LL}:FB_H$).

The flotation base (20) is generally made of a material that provides sufficient buoyancy to the system. For instance, suitable plastics or polymers may be used to produce the flotation base (20). In one embodiment, the flotation base (20) is annular/hollow to facilitate buoyancy. In one embodiment, the flotation base is in the form of an annular ring.

ii. The Flotation Insert

As shown in FIGS. 1, 3a-3b and 5-7, the flotation insert (30) comprises surrounding sidewalls (31) defining a hollow interior (38a). The hollow interior (38a) is sized to receive the food tray (40) such that the food tray (40) sits within the flotation insert (30). In the illustrated embodiment, a lip (39) is located proximal a distal end of the flotation insert (30), the lip (39) defining distal end opening (38b). Food tray (40) sits on the lip (39) and within hollow interior (38a) of the flotation insert (30). In the illustrated embodiment, the flotation insert (30) sits coaxially (e.g., concentrically) within the flotation base (20) and the food tray (40) sits coaxially within the flotation insert (30). However, other arrangements may be used.

The sidewalls (31) comprises an upper surface (32) and a lower surface (34). The flotation insert (30) further comprises one or more extensions (35) connected to the sidewalls (31) (e.g., integrally connected). In the illustrated embodiment, the extensions (35) are in the form of tabs. However, any suitable extension form/shape may be used. The flotation insert (30) is adapted to be removably inserted into and removed from the inner opening (28) of the flotation base (20). As inserted (see FIGS. 5-7), extension portions (35) of the flotation insert (30) sit within corresponding slots (26) of the outer perimeter (21) of the flotation base (20). As illustrated, four extension portions (35) in the form of tabs are provided. However, any number of slots (26) and corresponding tabs (35) may be used. In another embodiment, the flotation base (20) is absent of/free of any slots and the one or more extensions (35) of the flotation insert (30) sit on the upper surface (22) (e.g., a planar upper surface) of the flotation base (20).

In the mated arrangement, i.e., when the flotation insert (30) sits on the flotation base (20), the upper surface (32) of the sidewalls (31) may be disposed above the upper surface (22) of the flotation base (20). As described above, this arrangement facilitates retention of aquatic food materials (e.g., food particles or pellets) within the hollow interior (38a) of the flotation insert (30) (e.g., while such food materials hydrate) for provision of food materials to aquatic life of the aquarium (300). As inserted, the lower portion (34) of the sidewalls (31) may be disposed below the lower surface (24) of the flotation base (20) (e.g., for system stability; for localized provision of food). The flotation insert (30) may comprise one or more upper flanges (not illustrated) located at the top of the sidewalls (31). The flange(s) may facilitate removal of and insertion of the floatation insert (30) into and out of the flotation insert (20). Because such flange(s) are located above the upper surface (22) of the floatation insert (20), the flange(s) may further facilitate such removal/insertion of the flotation insert (30) while keeping the user's hands dry.

Figure 3A:
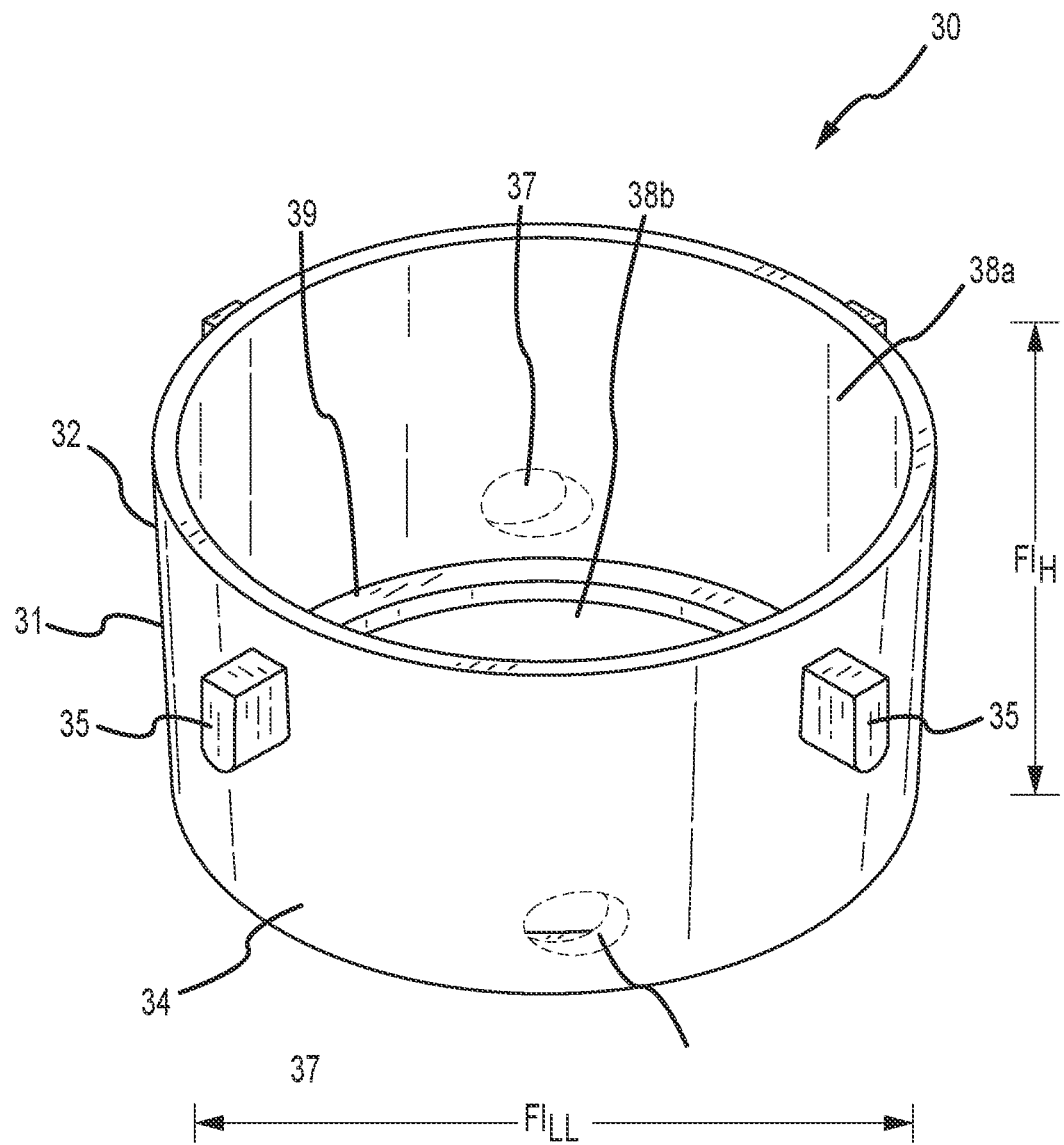
FIG. 3a is a perspective view of a floatation insert (30) of the embodiment of FIG. 1.
Figure 3B:
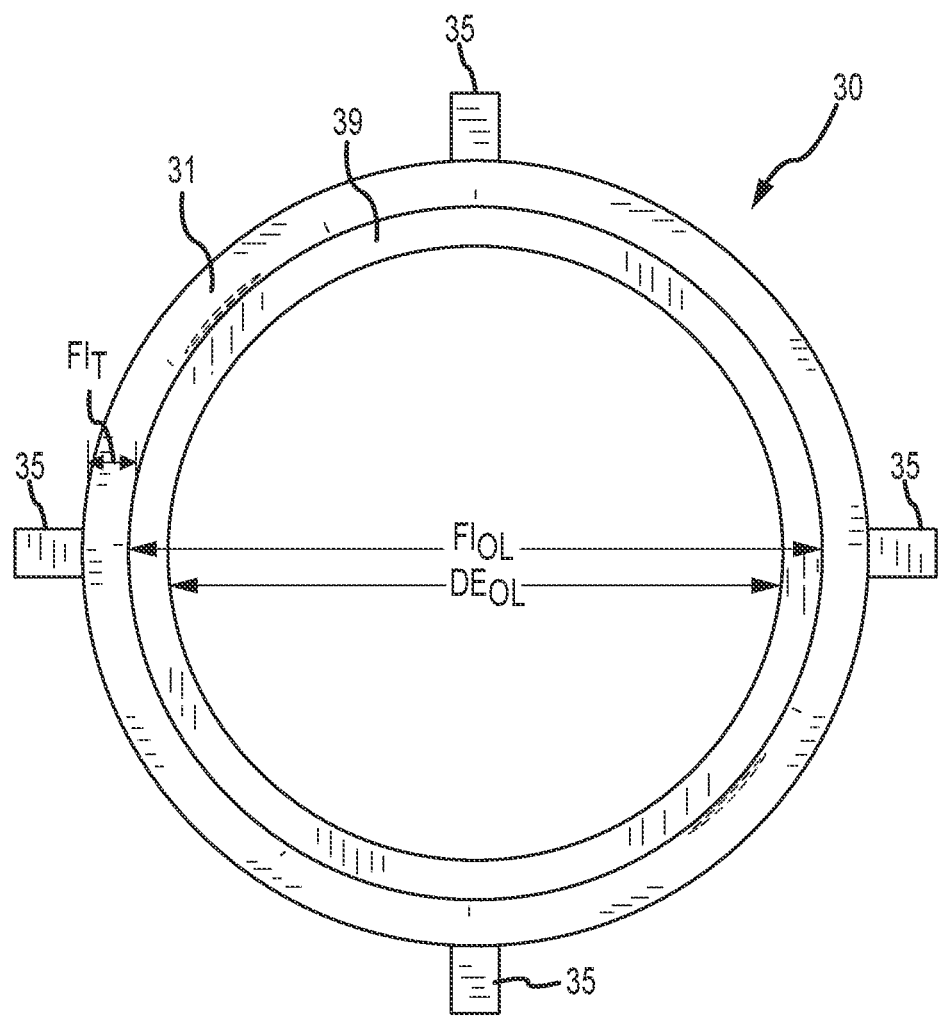
FIG. 3b is a top-down view of a floatation insert (30) of the embodiment of FIG. 1.
Figure 4:
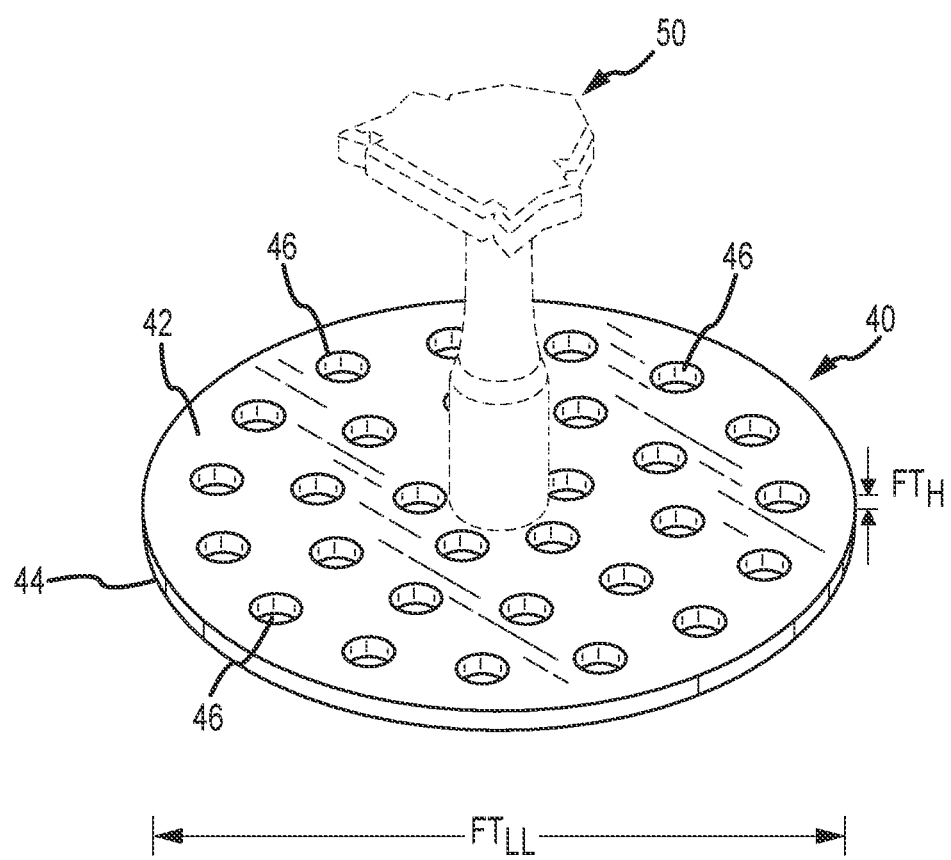
FIG. 4 is a perspective view of a food tray (40) and optional handle (50) of the embodiment of FIG. 1.
Figure 5:
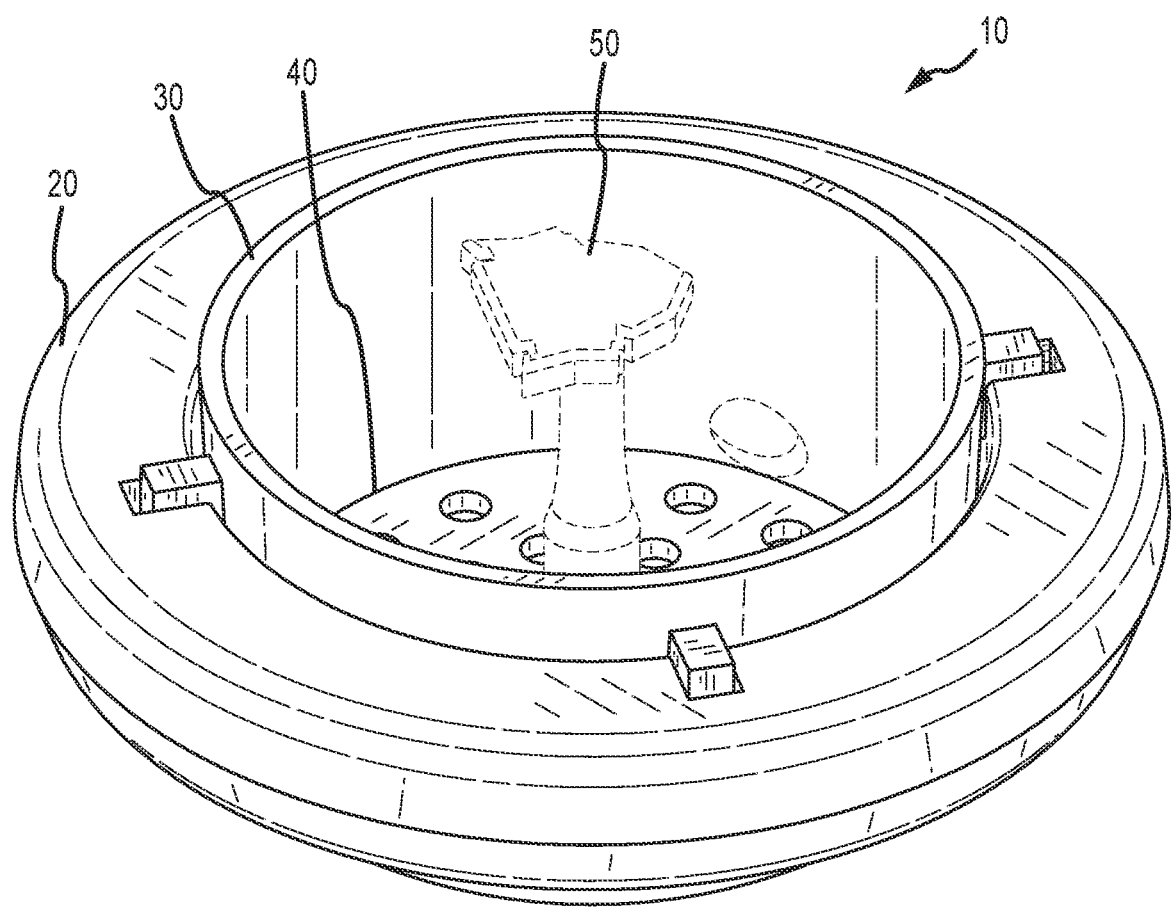
FIG. 5 is a perspective view of the assembled system (10) of FIG. 1.
Figure 6:
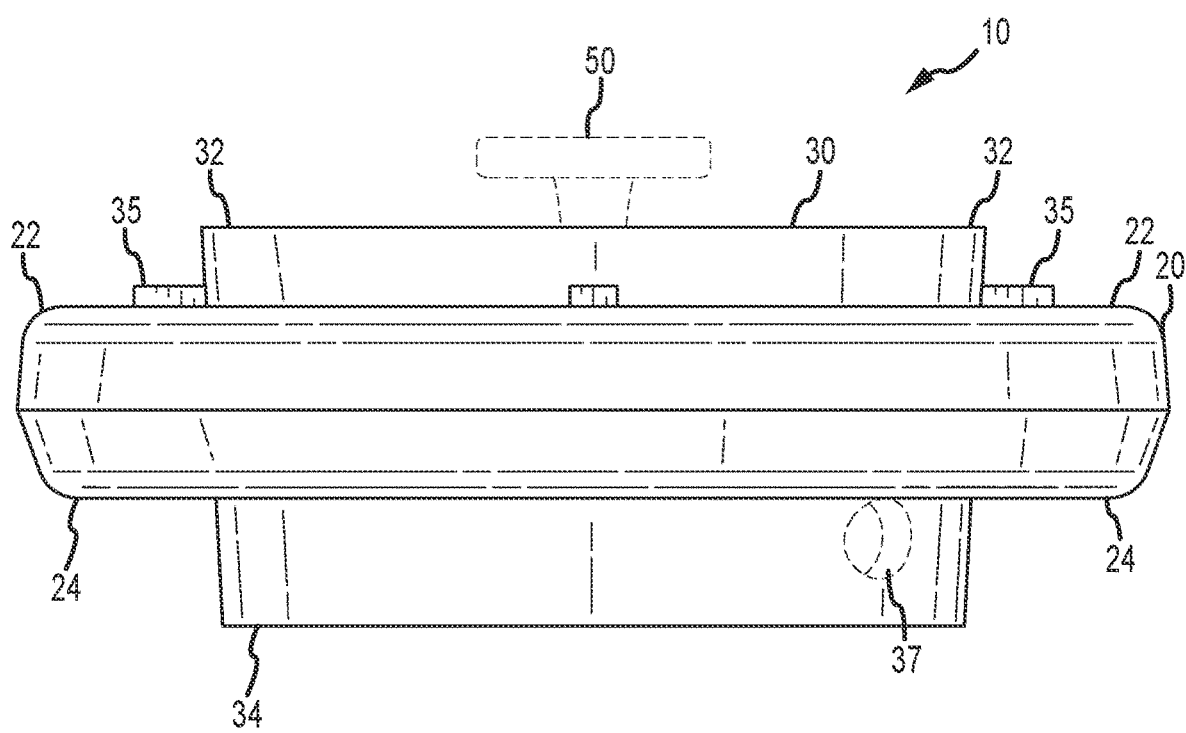
FIG. 6 is a side view of the assembled system (10) of FIG. 1.
Figure 7:
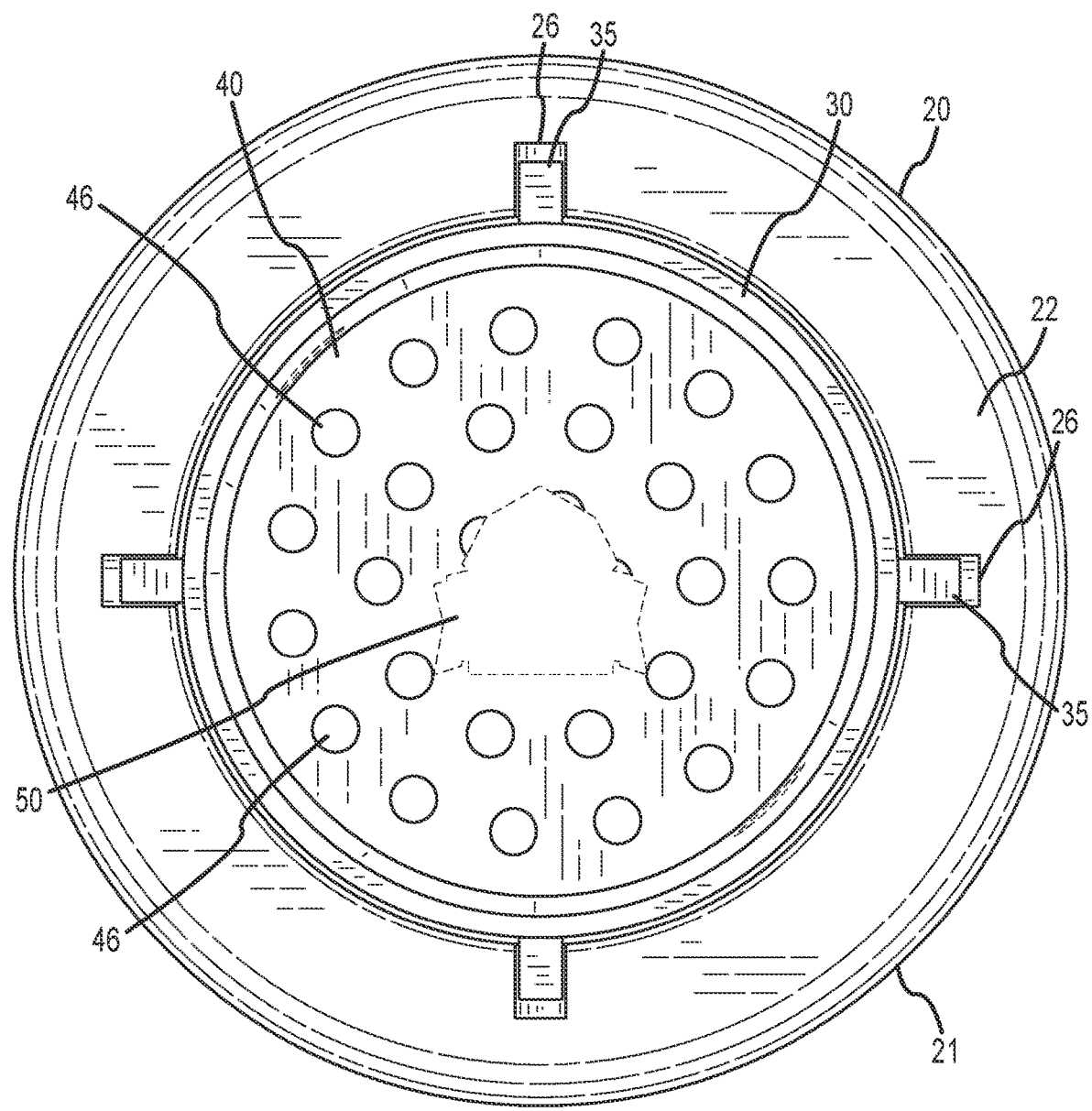
FIG. 7 is a top-down view of the assembled system (10) of FIG. 1.
Figure 8A:
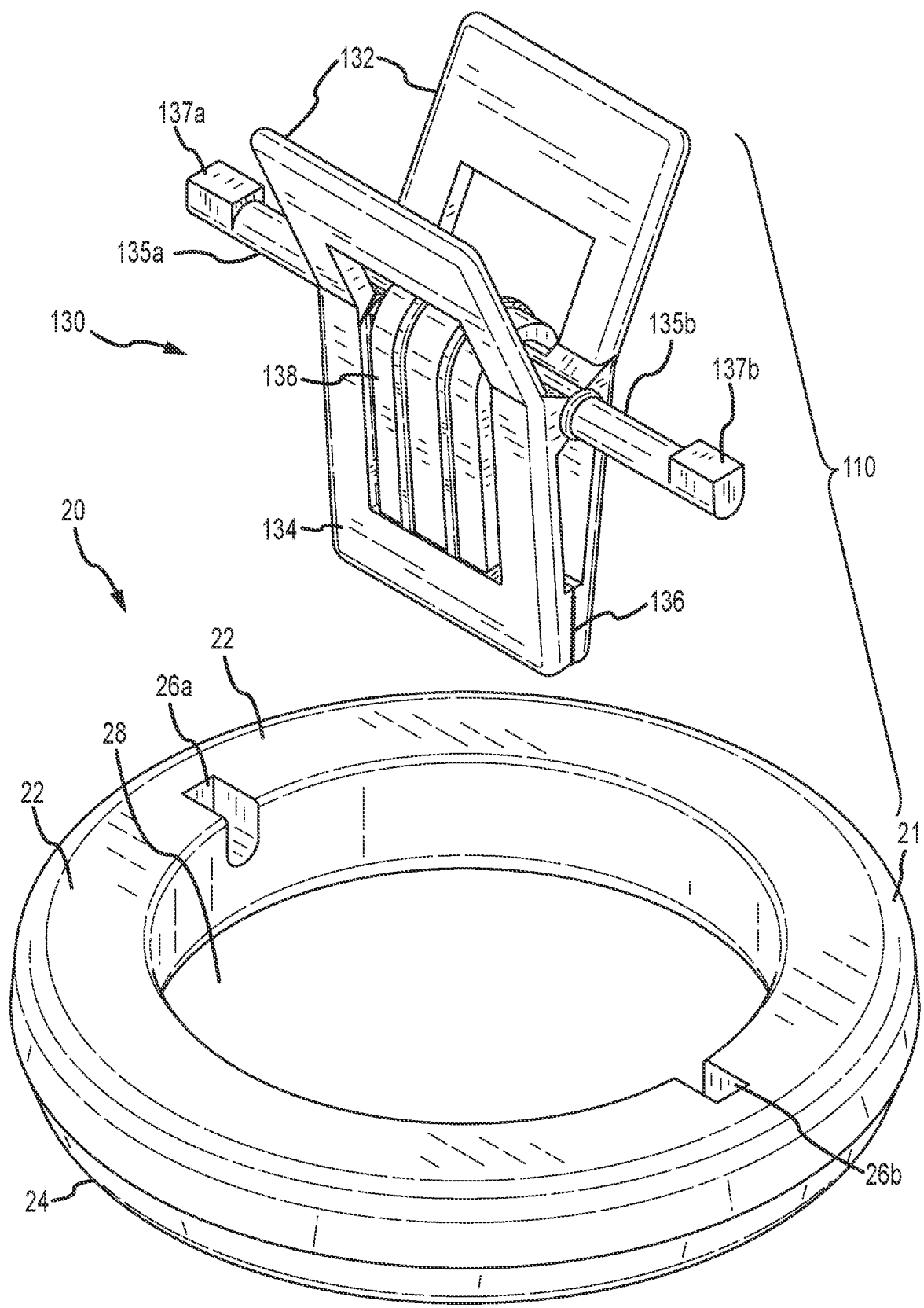
FIG. 8a is an exploded, perspective view of another embodiment of an aquarium feeding system (110) of the present disclosure.
Figure 8B:
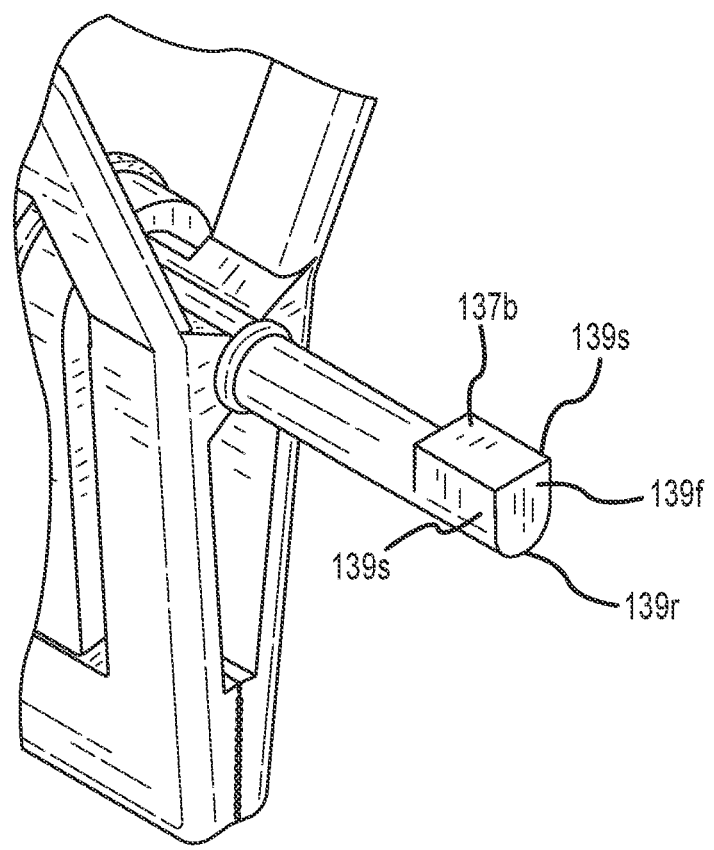
FIG. 8b is a close-up view of a portion of the clip (130) of FIG. 8a showing an arm of the clip (130).
Figure 9:
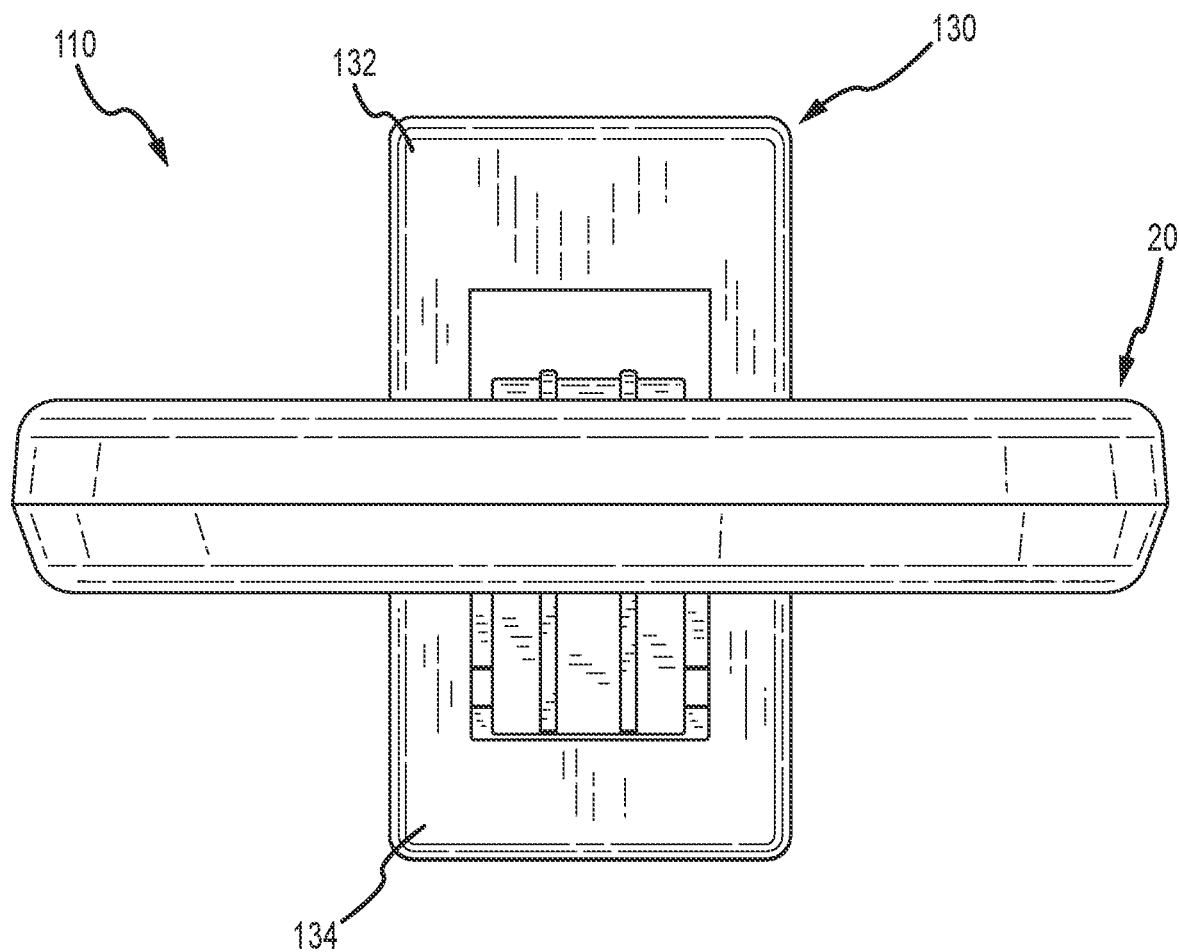
Figure 10:
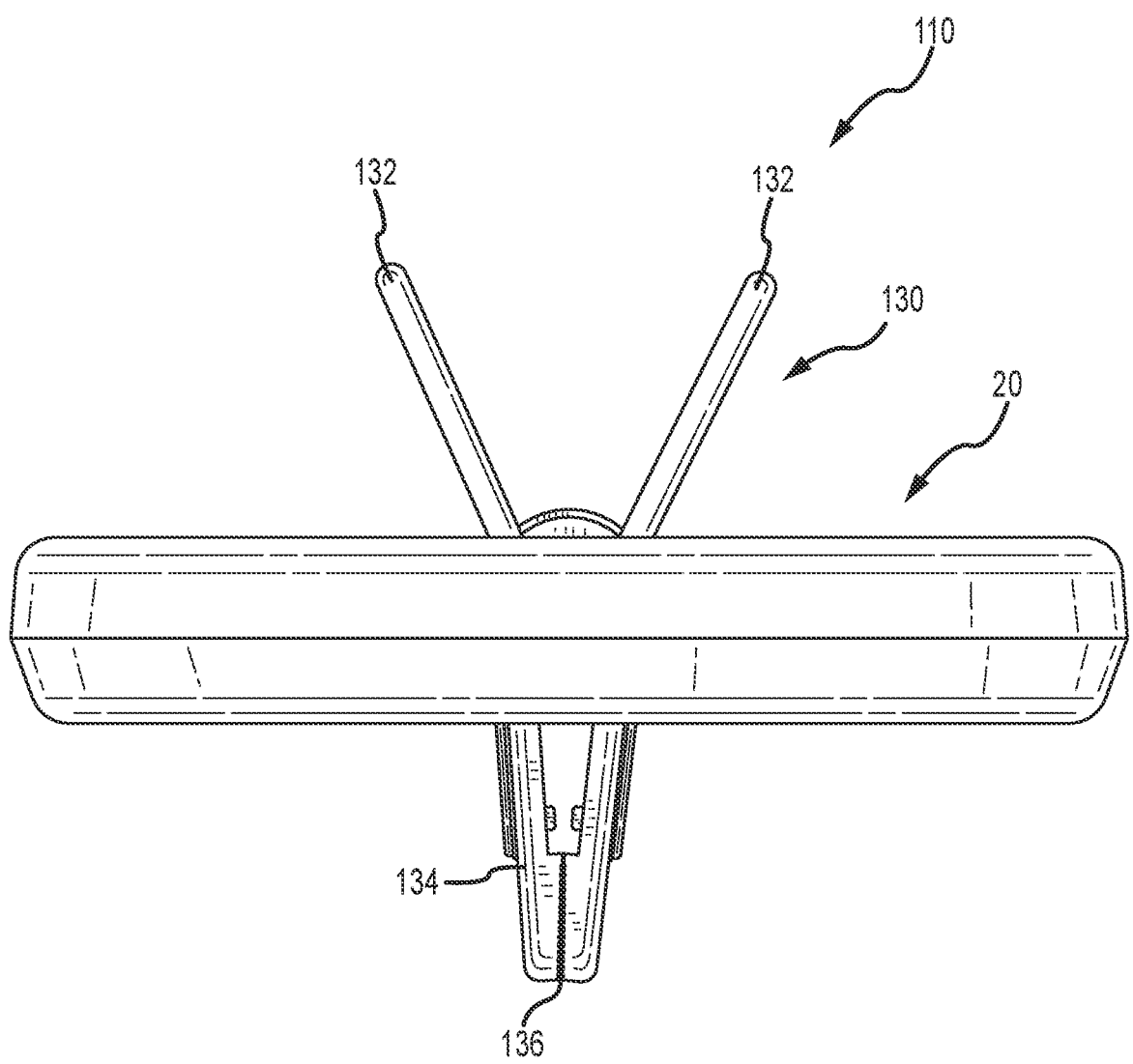
Figure 11:
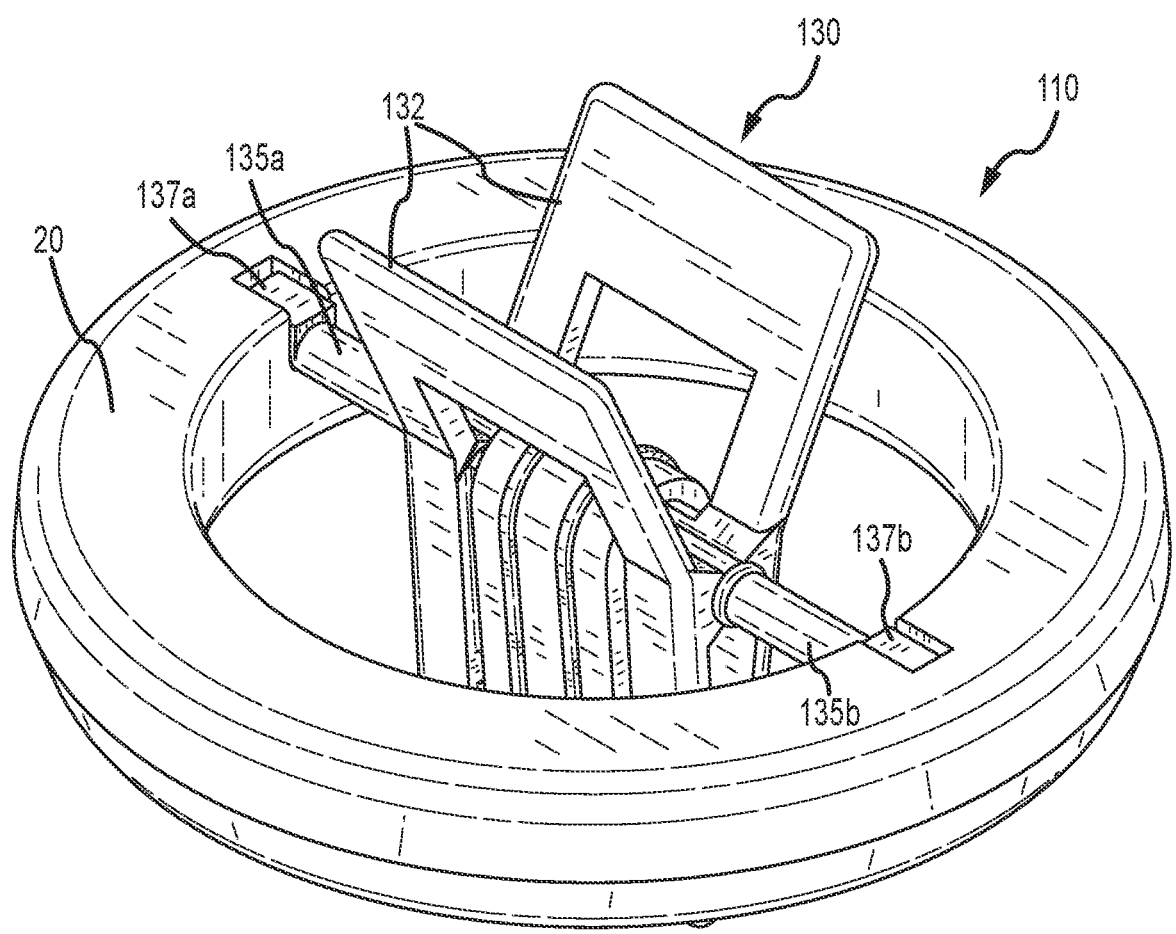

As illustrated, the distal end opening (38b) comprises a distal end opening length ($DE_{OL}$) and the hollow interior (38a) comprises a flotation insert opening length ($FI_{OL}$), wherein the distal end opening length ($DE_{OL}$) is smaller than the flotation insert opening length ($FI_{OL}$) (see FIG. 3b). In one embodiment, the distal end opening length ($DE_{OL}$) is 25-99% of the size of the flotation insert opening length ($FI_{OL}$). Thus, food tray (40) may be retained with the flotation insert (30) while allowing sufficient space (via distal end opening 38b) for food materials to be provided to the aquarium via apertures (46) of the food tray (40). In one embodiment, the distal end opening length ($DE_{OL}$) is at least 50% of the size of the flotation insert opening length ($FI_{OL}$). In another embodiment, the distal end opening length ($DE_{OL}$) is at least 75% of the size of the flotation insert opening length ($FI_{OL}$). In yet another embodiment, the distal end opening length ($DE_{OL}$) is at least 90% of the size of the flotation insert opening length ($FI_{OL}$).

The flotation insert (30) should be sized to ensure the system (10) does not flip during use. In one approach, the flotation insert (30) comprises a flotation inert longitudinal length ($FI_{LL}$) and a flotation insert height ($FI_H$) (see FIG. 3a). In one embodiment, a ratio of the flotation insert longitudinal length ($FI_{OL}$) to the flotation insert height ($FI_H$) is from 0.5 to 5.0 ($FI_{LL}$:$FI_H$). In another embodiment, a ratio of the flotation insert longitudinal length ($FI_{OL}$) to the flotation insert height ($FI_H$) is from 0.8 to 2.5 ($FI_{LL}$:$FI_H$). In one embodiment, the flotation insert longitudinal length ($FI_{OL}$) is greater than the flotation insert height ($FI_H$).

In one approach, the sidewalls (31) of the flotation insert (30) comprises a flotation insert thickness ($FI_T$) (see FIG. 3b). In one embodiment, the flotation insert thickness ($FI_T$) is not greater than 50% of the size of the flotation insert opening length ($FI_{OL}$). In another embodiment, the flotation insert thickness ($FI_T$) is not greater than 25% of the size of the flotation insert opening length ($FI_{OL}$). In yet another embodiment, the flotation insert thickness ($FI_T$) is not greater than 15% of the size of the flotation insert opening length ($FI_{OL}$). In another embodiment, the flotation insert thickness ($FI_T$) is not greater than 10% of the size of the flotation insert opening length ($FI_{OL}$). In yet another embodiment, the flotation insert thickness ($FI_T$) is not greater than 5% of the size of the flotation insert opening length ($FI_{OL}$).

In the illustrated embodiment, the flotation insert (30) is in the form of a column. However, any suitable geometric form having surrounding sidewalls defining a hollow interior may be used provided it corresponds with the geometric form of the flotation base (20).

The flotation insert (30) may optionally comprise one or more water inlet apertures (37). The water inlet apertures (37) may facilitate fluid communication between the hollow interior (38a) of the flotation insert (30) and water (W) of the aquarium (300). Accordingly, the system (10) may readily accept water into its interior for hydrating food provided by food tray (40). In the illustrated embodiment, the one or more water inlet apertures (37) are located proximal a bottom of the flotation insert (30) and above a top surface of the food tray (40). However, the aperture(s) (37) may be located at any suitable location in the sidewalls (31) of the flotation insert (30).

The water inlet aperture(s) (37) may also facilitate current flow within the interior of the system (10). The additional current flow offered by the water inlet aperture(s) (37) may facilitate deagglomeration and/or restrict/prevent clumping of food materials (e.g., as the food materials hydrate). Agglomerated food materials may be unable to exit the food tray (40) and/or may clog the apertures (46) of the food tray (40). Thus, the water inlet aperture(s) (37) may facilitate maintenance of appropriately sized food materials for provision to the aquarium via food tray (40).

iii. The Food Tray

As shown in FIGS. 1 and 4-7, the food tray (40) is sized to be inserted into and removed from the hollow interior (38a) of the flotation insert (30). In the illustrated embodiment, the food tray (40) comprises an upper surface (42) and a lower surface (44). A periphery of the lower surface (44) sits on lip (39) of the flotation insert (30) when food tray (40) is placed into the flotation insert (30).

The food tray (40) generally comprises one or more apertures (46). The aperture(s) (46) are sized to facilitate delivery of aquatic food to water (W) of the aquarium (300). For instance, the aperture(s) may facilitate fluid communication between the between the hollow interior (38a) of the flotation insert (30) and water (W) of the aquarium (300). Specifically, to facilitate provision of food materials, the food tray (40) is removed from flotation insert (30) by user, such as via optional handle (50). If the system (10) is not already within the aquarium (300), the flotation base (20) and flotation insert (30) are placed in aquarium (300) in mated form, as shown by, for instance, FIGS. 1, 5-7 and 14. If the system (10) is already within the aquarium (300), the user simply lifts the food tray (40) out of the flotation insert (30), leaving the mated flotation base (20) and flotation insert (30) within the aquarium (300). The user then places the food materials (e.g., dry/unhydrated, hydrated and/or live food materials) upon solid portions of the upper surface (42) of the food tray (40) and then inserts the food tray (40) into the flotation insert (30). As described previously, the flotation insert (30) has a height ($FI_H$) that rises above the water level (L) of the aquarium (300), which facilitates retention of the food materials within the system (10) via sidewalls (31) of the floatation insert (30), even if the food rises to the top of the water level (L) of the aquarium (e.g., as the food materials hydrate). The apertures (46) of the food tray (40) allow the food (F) to exit the system (10) and into the water below, thereby feeding aquatic life of aquarium.

As noted above, the food tray (40) may comprise an optional handle (50) attached to the food tray (40). In one embodiment, a top of the handle (50) protrudes above the upper surface (32) of the feeding insert (30). Accordingly, a user may remove the food tray (40) without touching water (W) of aquarium (300).

The food tray (40) should be sized to ensure the system (10) does not flip during use. In one approach, the food tray (40) comprises a food tray longitudinal length ($FT_{LL}$) and a food tray height ($FT_H$) (see FIG. 4). In one embodiment, a ratio of the food tray longitudinal length ($FT_{LL}$) to the food tray height ($FT_H$) is at least 10:1 ($FT_{LL}$:$FT_H$). In another embodiment, the ratio of the food tray longitudinal length ($FT_{LL}$) to the food tray height ($FT_H$) is at least 20:1 ($FT_{LL}$:$FT_H$). In yet another embodiment, the ratio of the food tray longitudinal length ($FT_{LL}$) to the food tray height ($FT_H$) is at least 30:1 ($FT_{LL}$:$FT_H$). In another embodiment, the ratio of the food tray longitudinal length ($FT_{LL}$) to the food tray height ($FT_H$) is at least 40:1 ($FT_{LL}$:$FT_H$). In yet another embodiment, the ratio of the food tray longitudinal length ($FT_{LL}$) to the food tray height ($FT_H$) is at least 50:1 ($FT_{LL}$:$FT_H$). In another embodiment, the ratio of the food tray longitudinal length ($FT_{LL}$) to the food tray height ($FT_H$) is at least 60:1 ($FT_{LL}$:$FT_H$). In yet another embodiment, the ratio of the food tray longitudinal length ($FT_{LL}$) to the food tray height ($FT_H$) is at least 70:1 ($FT_{LL}$:$FT_H$).

In the illustrated embodiment, the food tray is in the form of a flat sheet of a generally circular nature. However, any suitable geometric form may be used provided it corresponds with the geometric form of the flotation insert (30). Furthermore, the aperture(s) (46) may sized to facilitate appropriate food distribution rate(s) to the aquarium. Also, any number of aperture(s) may be used with the food tray (40) and the aperture(s) may be the same size/shape or the aperture(s) may be of different sizes and/or shapes.

In one embodiment, multiple different food trays (40) are used with a single system (10). For instance, a first food tray may comprise first apertures and a second food tray may comprise second apertures. The first apertures may be sized and/or shaped for feeding a first type of food and the second apertures may be sized and/or shaped for feeding a second type of food. In one embodiment, the second apertures are larger than the first apertures, such as when larger/different food materials are being used. The first food tray may be used with/inserted into the system (10) when the first food type is used. When the second food type is used, the first food tray may be readily removed from the flotation insert (30), such as by handle (50), after which the second food tray may be inserted into the floatation insert (30) and retained therein. The second food type may then be used with the system (e.g., to facilitate tailored provision of food to aquatic life). As one example, a first food type may be particles/pellets and the apertures of the first food tray are sized/shaped for provision of such materials to the aquarium. A second food type may be other materials, such as live worms (or other live food) or larger particles/pellets, and the apertures of the second food tray may be sized/shaped for provision of such materials to the aquarium. Thus, modularity of the system (10) is facilitated.

As shown in FIGS. 1 and 5-7, the flotation base (20), flotation insert (30) and food tray (40) may be in a mated arrangement. The modularity of the system (10) facilitates repeated insertion of and removal of the flotation insert (30) and food tray (40), as described above, and without fasteners. Thus, the three main system components may be fit together in the absence of a friction fit, i.e., may be loosely fitted together while still retaining the overall system (10) design while floating in an aquarium.

iv. Clip Embodiment

Referring now to FIGS. 8a-12, another embodiment of an aquarium feeding system (110) is illustrated. In the illustrated embodiment, the system (110) includes the same flotation base (20) as described above. The system (110) further comprises clip (130) mated with the flotation base (20). Specifically, the clip (130) comprises one or more arms (135a, 135b) adapted to be inserted into corresponding slots (26) or notches of the flotation base (20). In the illustrated embodiment, a first arm (135a) sits within a first slot (26a) of the flotation base via first outer end (137a). A second arm (135b) sits within a second slot (26b) of the flotation base (20) via second outer end (137b). As illustrated in FIG. 8b, the outer ends (137a, 137b) comprise at least one planar side face (139s) for engagement with corresponding planar side face(s) of the slots. Thus, rotation of the clip (130) about the arms (135a, 135b) is restricted/prevented. The arms (135a, 135b) may further comprise a planar front face (139f) and a rounded bottom (139r). However, any suitable complementary geometric shapes may be used for the slot(s) (26a, 26b) of the flotation base (20) and the outer arms (137a, 137b) of the clip (130). Moreover, while only two slots (26a, 26b) are illustrated, any number of slots may be used. For instance, the flotation base (20) may be configured to have a number of slots (26) that corresponds with the larger of (a) the number of extensions of the flotation insert (30) or (b) the number of arms (135) of the clip. Thus, the flotation base (20) may be used interchangeably with both the flotation insert (30) embodiments described above and the clip (130) embodiments described in this section.

With continued reference to FIGS. 8a-11, as inserted, handles (132) are disposed above a plane corresponding to the upper surface (22) of the floatation base (20). Thus, a user's handle may remain dry when inserting and removing the clip (130) from the flotation base (20). Jaws (34) are disposed proximal the inner opening (28) of the flotation base (20). In one embodiment, the jaws (34) are disposed at or below a plane corresponding to the lower surface (24) of the flotation base (20) for provision of food materials to aquatic life of the aquarium. In another embodiment, the jaws (34) are disposed at or above a plane corresponding to the lower surface (24) of the flotation base (20).

In operation, the clip (130) may be maintained in a first position, as illustrated in FIGS. 8a-12, such as by spring (138). Food material is placed within the clip (130) by moving the clip (130) to a second position. Specifically, a user opens clip (130) by pressing the two handles (132) towards one another, causing the spring force of the spring (138) to be overcome and the two jaws (134) to move away from one another (not illustrated). Seaweed or other suitable food material(s) may then be placed between the spaced apart jaws (134), after which the user releases the handles (132) causing the jaws (134) to be placed back into the first position. The food material(s) are gripped by jaws (134) of clip (130), such as by teeth (136).

If the system (110) is not already within the aquarium (300), the flotation base (20) is placed within aquarium (300). If the system (110) is already within the aquarium (300), the user simply lifts the clip (130) out of the flotation base (20), leaving the flotation base (20) within the aquarium (300). The user then places the food materials within the clip (130) as described above and then inserts the clip (130) into the flotation base (20), thereby causing the mated arrangement. The system (110) then moves freely about the aquarium with the food materials (e.g., seaweed) dangling therefrom. Accordingly, the exact place and location of where the aquatic food will reach the aquatic life is known (i.e., where the system (110) is located), enhancing the aquarium viewing experience of the users. Moreover, the system (110) generally floats freely around the aquarium via flotation base (20), so the food materials may be randomly distributed with each feeding, also enhancing the viewing experience of the users. The planar side face(s) (139s) of the outer ends (137a, 137b) of the arms (135a, 135b) prevent rotation of the clip, thereby maintaining position of the jaws (134) and, thereby, the food in the correct orientation, i.e., within the water (W) of the aquarium. However, in other embodiments, rounded ends may be used, such as when it is desired to allow the clip move rotationally about an axis. As noted previously, the handles (132) of clip (130) are located above the water level (L) of the aquarium so that the clip (130) may be inserted into and removed from base (20) by a user without contacting the water (W) of the aquarium (300).

As noted above, the clip (130) includes arms (135a, 135b) for mating with corresponding slots (26a, 26b) of the flotation base (20). In the illustrated embodiment of FIGS. 8a-11, the arms (135a, 135b) are an integral, one-piece arrangement. The arms (135) also define a fulcrum about which the clip may operate. Other arm arrangements may be used.

Figure 12:
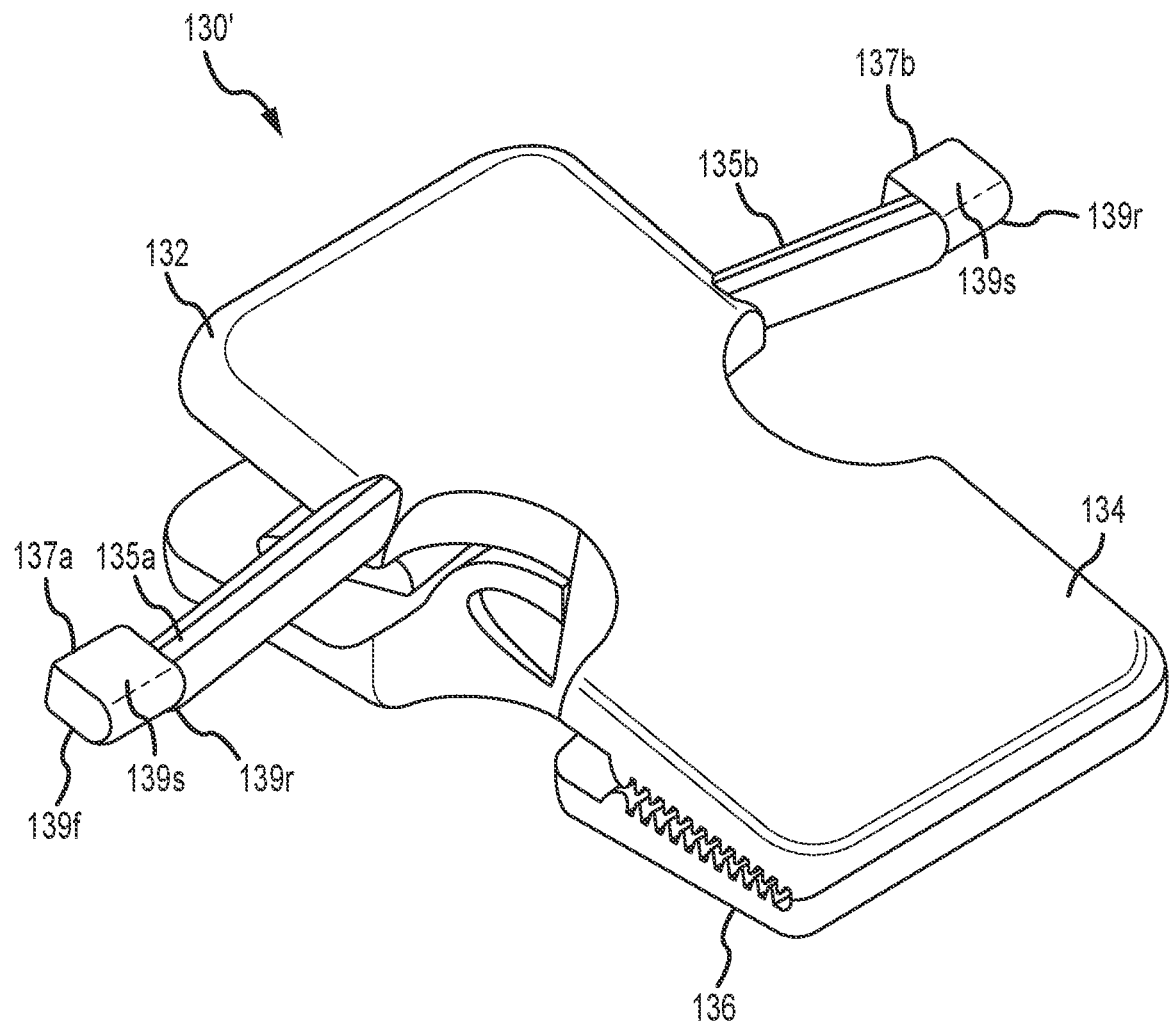
FIG. 12 is a perspective view of a second embodiment of a clip (130') for use with flotation base (20).

For instance, and referring now to FIG. 12, a second embodiment of a clip (130') is illustrated. In the illustrated embodiment, a first arm (135a) extends from a first side of a handle (132) of the clip (130). Outer end (137a) of the first arm (135a) is sized and shaped to mate with a first slot (26a) of the flotation base (20), as described above. A second arm (135b) may extend from a second, opposite side of the handle (132) of the clip (130). Outer end (137b) of the second arm (135b) is sized and shaped to mate with a second slot (26b) of the flotation base (20). The arms (135a, 135b) may be integral with the handle (132) or may be non-integral with the handle (132). For instance, the handle-arm arrangement may be 3D printed to produce an integral handle-arm arrangement. In another approach, the arm may be mechanically fastened or adhered to the handle to create a non-integral arrangement.

v. Basket Embodiment

Figure 13:
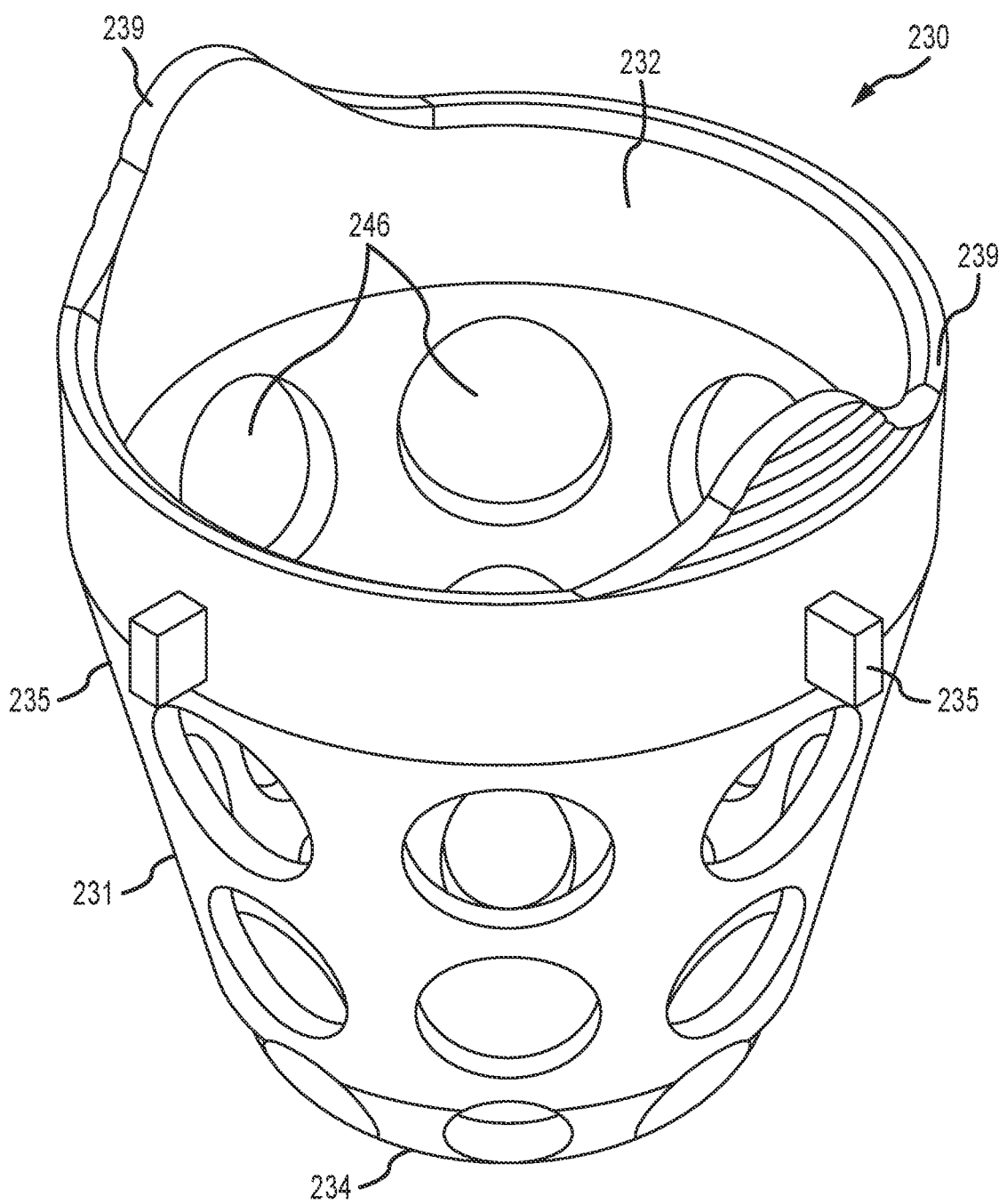
FIG. 13 is a perspective view of a basket embodiment (230) for use with flotation base (20).

Referring now to FIG. 13, the feeding apparatus may comprise a basket (230) for mating with flotation base (20). In the illustrated embodiment, the basket (230) comprises a bottom (234), surrounding sidewalls (231) and an open top (232). The bottom (234) and surrounding sidewalls (231) define an interior of the basket (230). One or more apertures (246) may be included in the sidewalls (231) and/or the bottom (234) of the basket (230). The apertures (246) are sized to allow passage of aquatic food into an aquarium. One or more extensions (235) extend from sidewalls (231) of the basket (230) for mating with corresponding slots (26) of the flotation base (20), similar to that of the floatation insert (30) of FIGS. 1-7.

In operation, if the system is not already within the aquarium, the flotation base (20) is placed within aquarium (300). If the system is already within the aquarium (230), the user simply lifts the basket (230) out of the flotation base, such as via flange(s) 239, leaving the flotation base (20) within the aquarium (300). The user then places the food materials within the basket (230) and then inserts the basket (230) into the flotation base (20), thereby causing the mated arrangement. The system then moves freely about the aquarium (300) with the food materials (e.g., seaweed; live food, such as worms; pellets) of the basket (230). The apertures (246) of the basket (230) allow for provision of food materials to the water (W) and, therefore, the aquatic life of the aquarium (300). Accordingly, the exact place and location of where the aquatic food (F) will reach the aquatic life is known (i.e., where the system is located), enhancing the aquarium viewing experience of the users. Moreover, the system generally floats freely around the aquarium (300) via flotation base (20), so the food materials may be randomly distributed with each feeding, also enhancing the viewing experience of the users. Also, because the flange(s) (239) of the basket (230) may extend above a plane corresponding with the upper surface (22) of the flotation insert (20), the flanges (239) allow for repeated removal and insertion of the basket (230) to and from the flotation insert (20) while keeping the user's hands dry.

While various embodiments of the new technology described herein have been described in detail, it is apparent that modifications and adaptations of those embodiments will occur to those skilled in the art. However, it is to be expressly understood that such modifications and adaptations are within the spirit and scope of the presently disclosed technology.

What is claimed is:

1. An aquarium feeding system (10) comprising:
   (a) a flotation base (20) adapted to float on water;
      (i) wherein the flotation based (20) comprises an outer perimeter (21) and an inner opening (28);
      (ii) wherein the outer perimeter (21) comprises an upper surface (22) and a lower surface (24);
   (b) a flotation insert (30) comprising a surrounding sidewall (31) defining a hollow interior (38a);
      (i) wherein the flotation insert (30) is adapted to be removably inserted into and removed from the inner opening (28) of the flotation base (20);
      (ii) wherein, as inserted, an extension portion (35) of the flotation insert (30) sits on a portion of the upper surface (22) of the outer perimeter (21) of the flotation base (20);
      (iii) wherein the flotation insert (30) comprises an inner lip (39) that protrudes inward from the surrounding sidewall (31) of the flotation insert (30) and defines a central distal end opening (38b) that is narrower than the hollow interior (38a) defined by the surrounding sidewall (31);
   (c) a food tray (40) adapted to be removably inserted into and removed from the hollow interior (38a) of the flotation insert (30),
      (i) wherein the food tray (40) comprises an upper surface and a lower surface;
      (ii) wherein the food tray (40) comprises one or more apertures (46) configured to allow passage of aquatic food to an aquarium, wherein the one or more apertures (46) are configured to allow the aquatic food to exit the aquarium feeding system below the lower surface of the food tray (40);
      (iii) wherein, as inserted, the food tray (40) sits on the inner lip (39) of the flotation insert (30).

2. The aquarium feeding system (10) of claim 1, wherein the flotation base (20) comprises at least one slot (26) for receiving the extension portion (35) of the flotation insert (30).

3. The aquarium feeding system (10) of claim 2, wherein the extension portion (35) of the flotation insert is in the form of a tab.

4. The aquarium feeding system (10) of claim 1, wherein the extension portion (35) of the flotation insert (30) is a plurality of extension portions (35), and wherein the flotation base (20) comprises a corresponding plurality of slots (26) for receiving the plurality of extension portions (36).

5. The aquarium feeding system (10) of claim 1, wherein the flotation base (20) is in the form of a tube.

6. The aquarium feeding system (10) of claim 1, wherein, as inserted, an upper surface (32) of the flotation insert (30) is disposed above the upper surface (22) of the flotation base (20).

7. The aquarium feeding system (10) of claim 1, wherein the inner lip (39) of the flotation insert (30) is located proximal a distal end of the flotation insert (30).

8. The aquarium feeding system (10) of claim 1, wherein a central distal end opening (38b) comprises a distal end opening length ($DE_{OL}$), wherein the hollow interior (38a) comprises a flotation insert opening length ($FI_{OL}$), wherein the distal end opening length ($DE_{OL}$) is smaller than the flotation insert opening length ($FI_{OL}$).

9. The aquarium feeding system (10) of claim 8, wherein a central distal end opening length ($DE_{OL}$) is 25-99% of the size of the flotation insert opening length ($FI_{OL}$).

10. The aquarium feeding system (10) of claim 1, wherein the flotation insert (30) comprises at least one water inlet aperture (37) in fluid communication with the hollow interior (38a) of the flotation insert (30).

11. The aquarium feeding system (10) of claim 10, wherein the at least one water inlet aperture (37) is located proximal a bottom of the flotation insert (30).

12. The aquarium feeding system (10) of claim 1, comprising a handle (50) attached to the food tray (40), wherein a top of the handle (50) protrudes above the upper surface (32) of the feeding insert (30).

* * * * *